Figure 1:
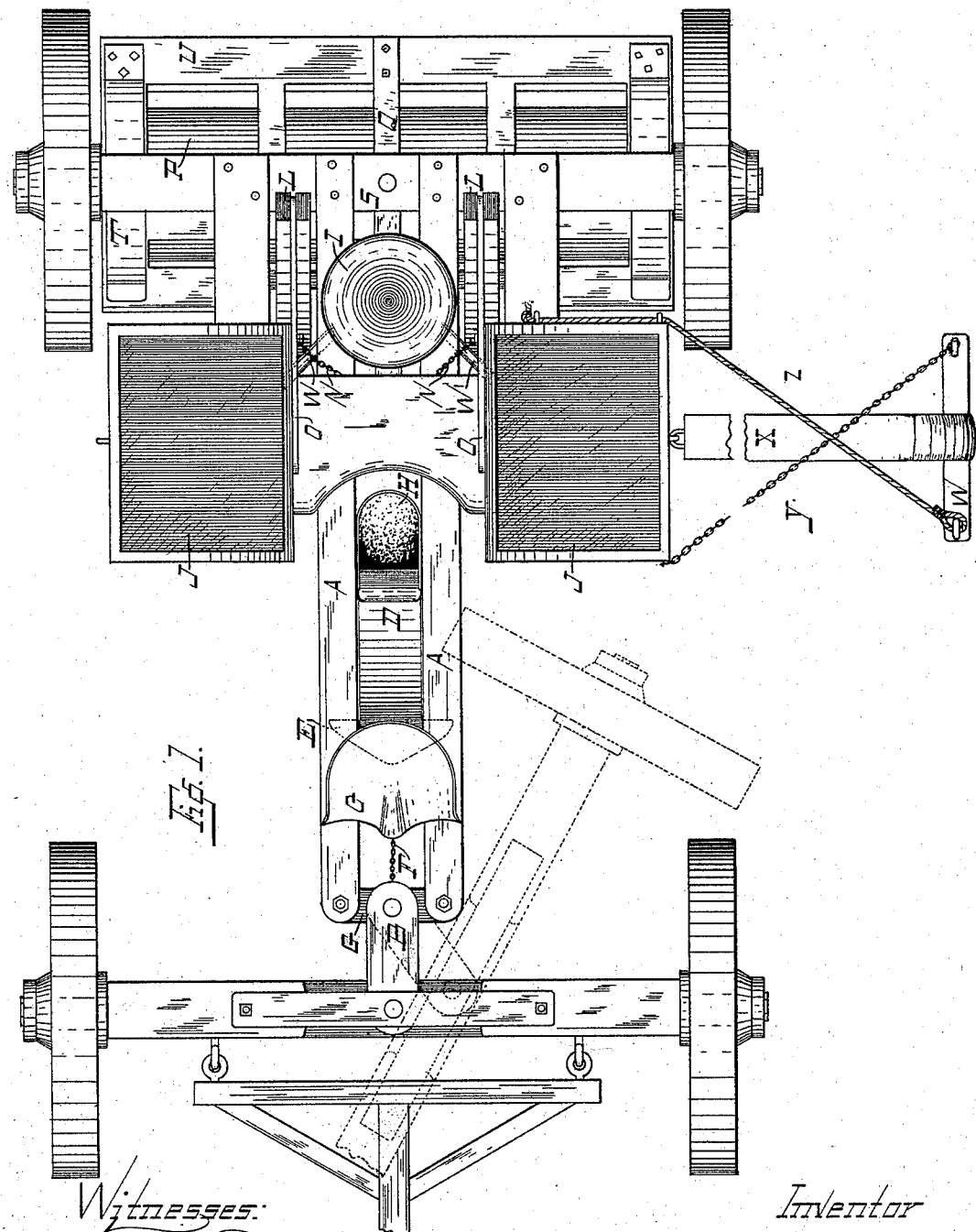

(No Model.) 2 Sheets—Sheet 1.

A. I. MERENESS.
POTATO PLANTER.

No. 575,258. Patented Jan. 12, 1897.

Witnesses:
Inventor
Alfred I. Mereness
By Erwin Wheeler & Wheeler
Attorneys.

(No Model.) 2 Sheets—Sheet 2.
A. I. MERENESS.
POTATO PLANTER.
No. 575,258. Patented Jan. 12, 1897.
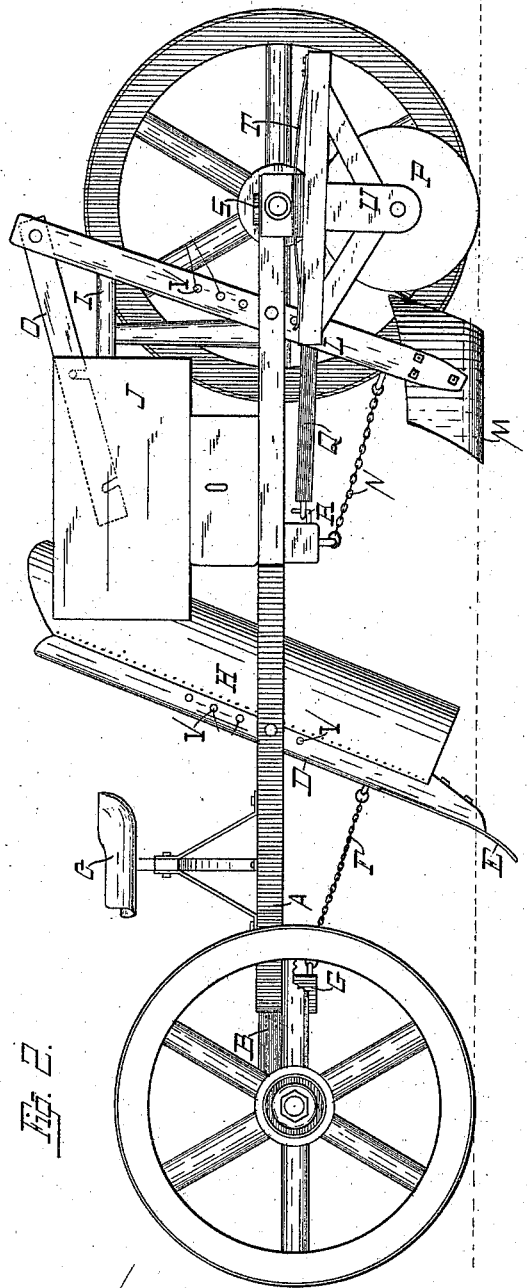
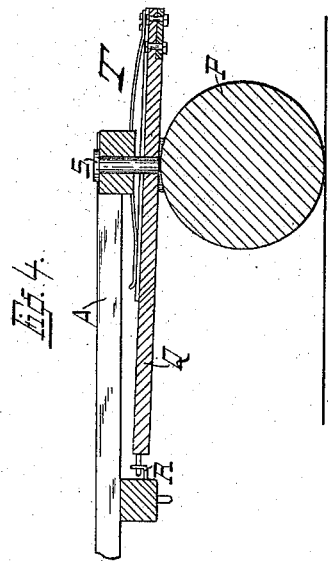
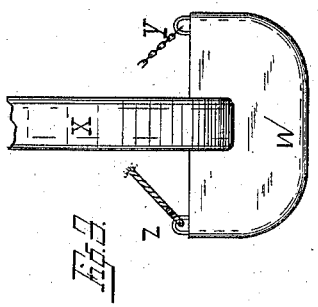
Witnesses:
Inventor
Alfred I. Mereness
By Erwin Wheeler & Wheeler
Attorneys.

UNITED STATES PATENT OFFICE.

ALFRED I. MERENESS, OF GENEVA, WISCONSIN.

POTATO-PLANTER.

SPECIFICATION forming part of Letters Patent No. 575,258, dated January 12, 1897.

Application filed March 25, 1896. Serial No. 584,802. (No model.)

*To all whom it may concern:*

Be it known that I, ALFRED I. MERENESS, a citizen of the United States, residing at North Geneva, in the county of Walworth and State of Wisconsin, have invented new and useful Improvements in Potato-Planters, of which the following is a specification.

My invention relates to improvements in potato-planters.

Heretofore it has been attempted to provide potato-planters in which the seed is automatically dropped into the furrow; but a great difficulty has been experienced owing to the varying size of the potatoes, which makes it impossible to drop them uniformly with automatic mechanism. I have therefore not attempted to construct an automatic dropper, but have provided for supporting the potatoes in one or more receptacles upon a wheeled vehicle, from which they are dropped by the operator into a chute or conveyer which guides them to the furrow.

My invention further pertains to certain other peculiar and novel features of construction hereinafter specifically described and claimed, the purpose of which will be evident from the description and illustrations.

In the drawings, Figure 1 is a plan view of my invention. Fig. 2 is a side elevation of the same. Fig. 3 is a detail side view of the marker. Fig. 4 is a cross-section view of the roller and rear axle drawn through the connecting-bolt.

Like parts are identified by the same reference-letters throughout the several views.

The supporting-vehicle is provided with double reach-bars A A, connected with the king-bolt by a link B, which permits the vehicle to make a very short turn, as shown by dotted lines in Fig. 1. The driver's seat C is located near the front end of the bars A A.

A furrow-opener or plow E and chute H are supported from the reach in the rear of the driver's seat by a pivoted adjustable standard D, the latter being connected at a point below its pivotal support with the cross-bar G of the reach by chains F, thus holding the plow at the proper angle. The operator occupies the seat I, removes the potatoes from the boxes J, and drops them into the chute H, which guides them into the furrow immediately in the rear of the plow E. When not in use, the upper end of the standard is drawn backwardly to throw the plow out of engagement with the soil.

The furrow-coverers M are supported from the reach-bars by the pivoted and adjustable standards L L and are held at the proper angle when in use by the chains N. When not in use, the upper ends of the standards are pushed or tilted backwardly, thus elevating the coverers, and are held in the tilted position by notched bars O, which are pivotally connected with standards L L near their upper ends and engage with projecting pins in the sides of the boxes J.

P is a roller connected with the vehicle by the beam Q, which engages with a hook R, as best shown in Fig. 2, and also by a bolt S, as best shown in Fig. 4. Springs T intervene between the roller-frame U and the rear axle, thus taking off the jar which would otherwise be communicated from the roller to the vehicle.

It will be observed that the roller supports the rear end of the vehicle entirely when in place, but that by withdrawing the bolt S and unhooking the beam Q the roller may be easily removed whenever it is not needed, and especially when the soil is moist and would harden if rolled. It will also be observed that both the plow and the covering-teeth may be adjusted to correspond with the condition of the soil by means of the series of holes V V, formed in the respective supporting-standards for the reception of the pivot-pin.

W is a marker located on the outer end of the laterally-projecting bar X, the inner end of the latter being hooked on the side of the box J, as shown. The marker is held in a parallel position to that of the vehicle by the chain Y, which connects its rear end to the front side of the box, and I have also provided a rope Z, attached to the marker and adapted to permit the latter to be raised when not in use. One of these markers may thus be provided on each side, or a single marker may be used by removing it from one side to the other with each turn of the vehicle.

Having thus described my invention, what I claim as new, and desire to secure by Letters Patent, is—

1. A potato-planter, consisting in the combination of a supporting-vehicle, a plow secured to a pivotally-supported standard and connected with said vehicle, a chute secured to the rear side of said plow-standard, potato-boxes located on said frame, and independent of said chute, coverers independently and adjustably attached to said frame, and a roller adapted to support the rear end of the vehicle and smooth the soil in the rear of said coverers, substantially as described.

2. A potato-planter, consisting in the combination with the vehicle-frame of the pivotally-supported plow depending therefrom, a chute connected with said plow-support, the coverers supported in the rear of said plow and chute, and the roller supporting the rear end of said frame, substantially as described.

3. A potato-planter consisting in the combination with the supporting-vehicle, of the plow connected therewith, the chute arranged to guide the dropped potatoes into the furrow, and the coverers arranged to refill the furrow, together with a detachable roller adapted to support the rear axle with the wheels free from contact with the ground and springs intervening between the roller-frame and the axle whereby the vehicle is relieved from the jar of said roller, substantially as described.

In testimony whereof I affix my signature in the presence of two witnesses.

ALFRED I. MERENESS.

Witnesses:
JAS. B. ERWIN,
LEVERETT C. WHEELER.